(12) United States Patent
Drouart et al.

(10) Patent No.: US 8,073,654 B2
(45) Date of Patent: Dec. 6, 2011

(54) PROCESS FOR CONTROLLING THE ENERGY PERFORMANCE OF AN INDUSTRIAL UNIT

(75) Inventors: Caroline Drouart, Chatillon (FR); Thierry Roba, Bonefe (BE)

(73) Assignee: L'Air Liquide Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 1589 days.

(21) Appl. No.: 11/301,976

(22) Filed: Dec. 13, 2005

(65) Prior Publication Data

US 2006/0136100 A1 Jun. 22, 2006

(30) Foreign Application Priority Data

Dec. 17, 2004 (FR) ...................................... 04 53033

(51) Int. Cl.
*G06F 11/30* (2006.01)
(52) U.S. Cl. ...................................................... 702/182
(58) Field of Classification Search .............. 702/57–60, 702/64, 65, 98–100, 106, 130, 132, 136, 702/179, 182, 183, 188, 193; 700/33, 36, 700/37, 99, 106; 705/412; 703/2; 62/656
See application file for complete search history.

(56) References Cited

U.S. PATENT DOCUMENTS

| 6,666,049 B1 * | 12/2003 | Katende et al. ................. 62/656 |
| 2002/0010563 A1 * | 1/2002 | Ratteree et al. .................... 703/2 |
| 2003/0097243 A1 | 5/2003 | Mays et al. ........................ 703/2 |

FOREIGN PATENT DOCUMENTS

| EP | 0 581 273 | 2/1994 |
| WO | WO 2010/072803 | 7/2010 |

OTHER PUBLICATIONS

French Search Report for FR 0453033.
Patent Abstracts of Japan, vol. 1997, No. 03, Mar. 31, 1997, & JP 08 308108, Nov. 22, 1996.

* cited by examiner

*Primary Examiner* — Mohamed Charioui
(74) *Attorney, Agent, or Firm* — Elwood L. Haynes

(57) ABSTRACT

Process for controlling the energy performance of an industrial unit, in which process: the value of a set (V) of variables relating to the industrial unit and to the environment are measured, as is the value of a quantity representing the energy performance (W), an estimate ($W_e$) of the quantity representing the energy performance is calculated, the value of an energy performance indicator (TE, $TE_+$) is determined and the value of this indicator is compared with at least one threshold value (S) determined so as to detect a drift in the energy performance.
The invention proposes the learning of a model based on the best energy performance (W) observed for each value of a set (V) of input variables and in the proposing in real time to the operator of a best configuration and of best settings (CR) of the equipment based on those associated with this best energy performance (W) observed in the past for the current value of the set (V) of input variables.

20 Claims, 3 Drawing Sheets

PROCESS FOR CONTROLLING THE ENERGY PERFORMANCE OF AN INDUSTRIAL UNIT

This application claims the benefit of priority under 35 U.S.C. §119 (a) and (b) to French Application No. 0453033, filed Dec. 17, 2004, the entire contents of which are incorporated herein by reference.

BACKGROUND

The present invention relates to a process and to a system for controlling the energy performance of an industrial unit or of a part of the latter.

An industrial unit uses equipment which consume electrical power, for example an air separation unit comprising a whole set of equipment of the compressor, liquefier and pump type, or for example also a part of said unit such as a set of compressors.

The cost of operating a unit of this type is mainly constituted by the purchasing of the electrical power necessary for the operation of the abovementioned equipment.

Such equipment forms the subject of configurations and settings which have an influence on the electrical power consumed by the industrial unit, for a given production constraint.

Various existing solutions aim to minimize the energy cost in conjunction with a variation in the cost of purchase of the electrical power over time by optimizing production.

In particular, document EP 0 581273 describes a process optimization process, in which a modelling of an industrial unit is carried out, the model thereafter being optimized and subjected to particular production constraints. The process aims to obtain optimization of production over a given period of time, as a function of the variable cost of the energy consumed in the course of this period of time.

This process uses a method of solution of the model and an optimization which do not make it possible to carry out monitoring of the system with a view to improving its settings and its configuration for a given production.

It is also desirable to optimize the mode of running, that is to say all the settings of the unit, for a given production constraint.

To do this, the consumption of electrical power must form the subject of tracking, so as to determine whether the settings are satisfactory or not from a point of view of the consumption of electrical power, and to correct these settings if necessary, so as to avoid drifting of electrical power consumption and to optimize the use of the equipment.

For this purpose, document US 2003/0097243 describes a process and a system intended for controlling an industrial unit for hydrocarbon production. The process described uses a mixture of linear and nonlinear models with a view to solving the model and optimizing production and with a view to providing proposals for configuring the system.

This document does not describe a solution making it possible to track performance.

The document U.S. Pat. No. 6,666,049 describes a process for controlling a cryogenic industrial unit, in which process a monitoring of performance indicators is carried out, these indicators being compared in real time with nominal values, and proposals for modifications are made if the values of the indicators deviate from the nominal values, the process being based on a prerecorded diagnostic tree providing qualitative suggestions.

This document does not describe precisely the model used, nor its mode of construction, nor the settings to be performed in real time on the equipment.

The aim of the present invention is to provide a process for controlling the energy performance of an industrial unit which makes it possible to take account of the specific features of a particular industrial unit, without using any complex modelling of the behaviour of this unit, and which makes it possible to signal the drifting of electrical power consumption and to optimize the use of the equipment.

Another aim of the invention is to allow the control of an industrial unit as a whole, or of a subpart of this unit comprising a whole set of equipment.

The subject of the present invention is a process for controlling the energy performance of an industrial unit or of a part of the latter, in which process:

the value of a set of variables relating to the production of the industrial unit and to the environment are measured, as is the value of a quantity representing the energy performance, an estimate of the quantity representing the energy performance is calculated, using a statistical model calibrated during a phase of learning over a reference period, on the basis of the values of the set of the variables relating to the production of the industrial unit and to the environment, the value of an energy performance indicator is determined on the basis of the measured value and estimated value of the quantity representing the energy performance, the value of this indicator is compared with at least one threshold value determined so as to detect a drift in the energy performance.

These provisions make it possible to tailor the model for each production unit.

The statistical model calibrated by learning takes account of the operating point of the plant and the inaccuracy in the measurement instrumentation. In fact it suffices for the measurements to be reproducible in order for this model to be usable.

The development cost is low, since the method is simple, as is the handling by non-specialist operators.

Upon changes due to significant maintenance, a new calibration may also be performed simply, since it is based on automatic measurements and learning, and not on physical modelling of the industrial unit.

Advantageously, the quantity representative of the energy performance is the electrical power consumed of the industrial unit.

According to a mode of implementation, an alert to an operator is emitted in case of energy over-consumption.

Advantageously, the energy performance indicator is defined as the ratio of the measured value to the estimated value of the quantity representing the energy performance.

According to a possibility, the statistical model is of linear type, in particular obtained by linear regression on data of the learning phase.

According to another possibility, the statistical model is of nonlinear type, in particular comprising at least one neural network or tools for local regression.

According to a mode of implementation, during the learning phase, the operating points, corresponding to the best energy performance observed associated with each given value of the set of input variables, are taken into account in the model.

Advantageously, in the model, each association between a given value of the set of input variables and the best energy performance, corresponding to an operating point, also comprises the set of configuration and setting data for the equipment associated with this operating point and this best energy performance.

According to an embodiment, when an over-consumption is detected, the model provides a set of learnt configuration and setting data for the equipment that made it possible to obtain the best energy performance for the current value of the set of input variables.

According to a first possibility, the set of input variables comprises:
the atmospheric pressure and the ambient temperature,
production flow rates for the unit,
production pressures for the plant,
production rating data,
flow rates of vaporization of the liquids and of venting of gases,
the set of configuration and setting data for the equipment comprises the configuration of the equipment and their setting in terms of flow rate, and the energy performance is that of the industrial unit as a whole.

According to a second possibility, the set of input variables comprises:
the flow rate and the pressure of the gas produced from a group of equipment of compressor type,
the pressure and the temperature upstream of the compressors,
the set of configuration and setting data for the equipment comprises the configuration of the equipment and their setting in terms of flow rate, and the energy performance is that of the group of compressors.

According to a third possibility, the set of input variables comprises:
the liquid flow rate of product leaving a liquefier,
the pressure and the temperature of the gas entering the liquefier,
the set of configuration and setting data for the equipment comprises the pressure of the cycle, the temperature of the liquid and the recycling flow rate, and the energy performance is that of the liquefier.

Advantageously, the set of configuration and setting data for the equipment of the industrial unit comprises at least one variable of usage of an item of equipment indicating its on or off state.

According to a mode of implementation, the set of configuration and setting data for the equipment of the industrial unit comprises at least one value of setting of an item of equipment, in particular a flow rate setting.

Advantageously, the set of learnt configuration and setting data for the equipment that made it possible to obtain the best energy performance for the current value of the set of input variables is proposed to the user, with:
the list of advocated equipment, using the on/off values of the usage variables recorded, and
the estimate of the settings for the equipment, if necessary.

According to a mode of implementation, a list of the changes induced so as to achieve a given configuration and settings of the equipment with respect to the current configuration and settings is provided, indicating the equipment to be turned off or to be started up, as well as the possible settings to be effected.

Advantageously, the process is implemented in real time, the measurements being performed continuously.

According to a mode of implementation, a recalibration is performed, so as to integrate new learning data, at a pre-established frequency, or on the request of an operator.

The subject of the present invention is also a system for controlling the energy performance of an industrial unit, making it possible to implement a process according to the invention, comprising:
means of measurement in the industrial unit,
means of storage making it possible to record the corresponding data,
means of calculation,
means of informing an operator,
means of network communication linking the components of the control system.

In any event, the invention will be better understood with the aid of the description which follows, with reference to the appended diagrammatic drawing, representing by way of non-limiting example two embodiments of a system according to the invention.

Figure 1:
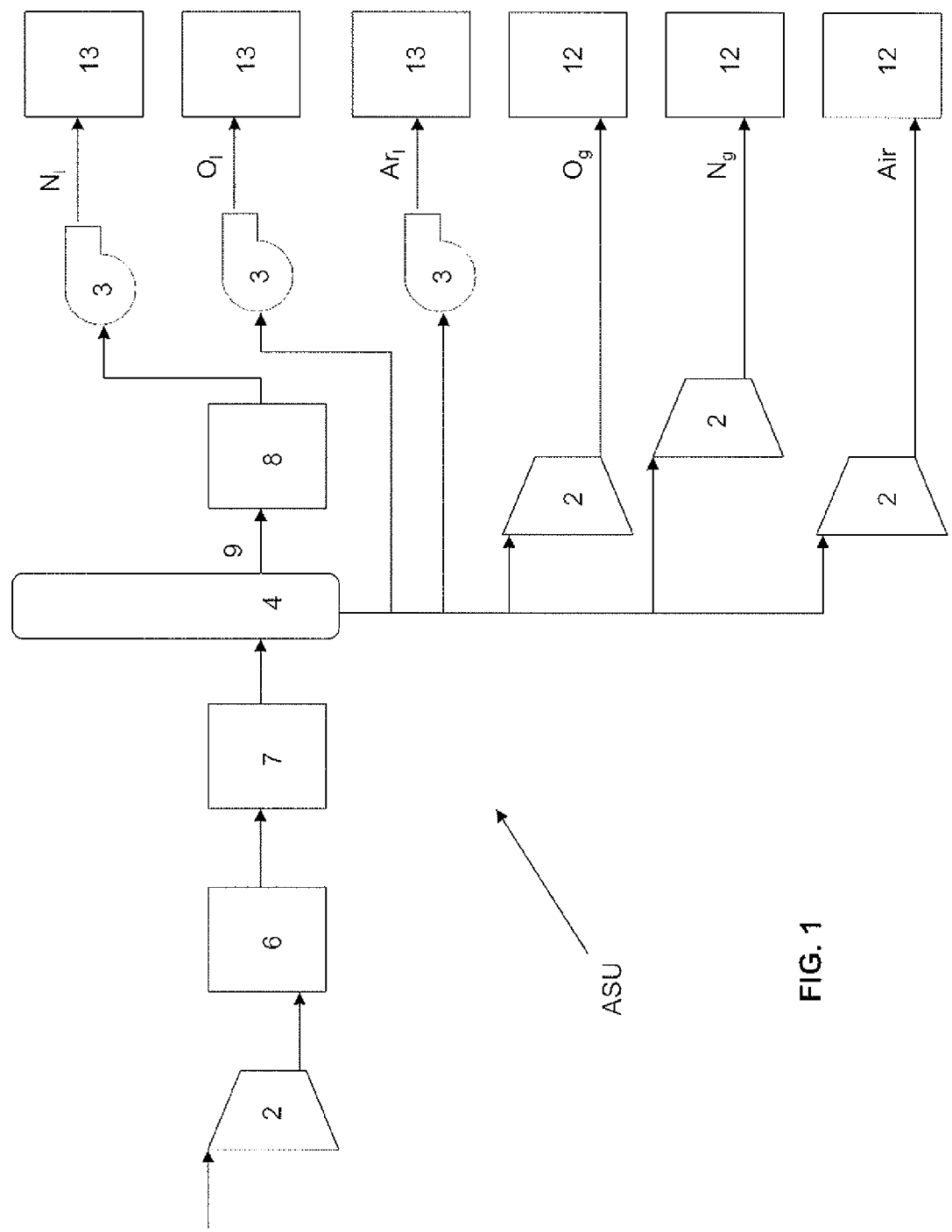
FIG. 1 is a diagrammatic view of an industrial unit intended in particular for separating gases from the air.

As represented in FIG. 1, diagrammatically, an industrial unit ASU for separating gases from the air comprises in particular compressors 2, as well as pumps 3, this equipment representing the main sources of consumption of electrical power of the unit.

The industrial unit ASU also comprises distillation columns or oxytonnes 4.

A single item of equipment of each category is represented in FIG. 1, for greater clarity.

While operational, the unit ASU makes it possible to carry out the following operations. Ambient air is sucked into the inlet 5, then compressed by a compressor 2, and cooled by a cooler 6, purified in a purification unit 7 before being introduced into a distillation column 4.

A distillation column 4 makes it possible to output:
oxygen in gaseous form $O_g$ and liquid form $O_l$,
nitrogen in gaseous form $N_g$,
argon in liquid form $Ar_l$.

Compressed air is also produced by compression of the ambient air.

The unit ASU also comprises a liquefier 8 for carrying out the production of liquid nitrogen $N_l$, on the basis of gaseous nitrogen $N_g$ coming from a column 4, as represented diagrammatically in FIG. 1 by the link 9.

The gaseous products, after compression by compressors 2, are conveyed by pipes 10 to customer sites 12, for immediate consumption. The liquid products are stored in tanks 13, then subsequently delivered to the customers, by appropriate means of transport.

Figure 2:
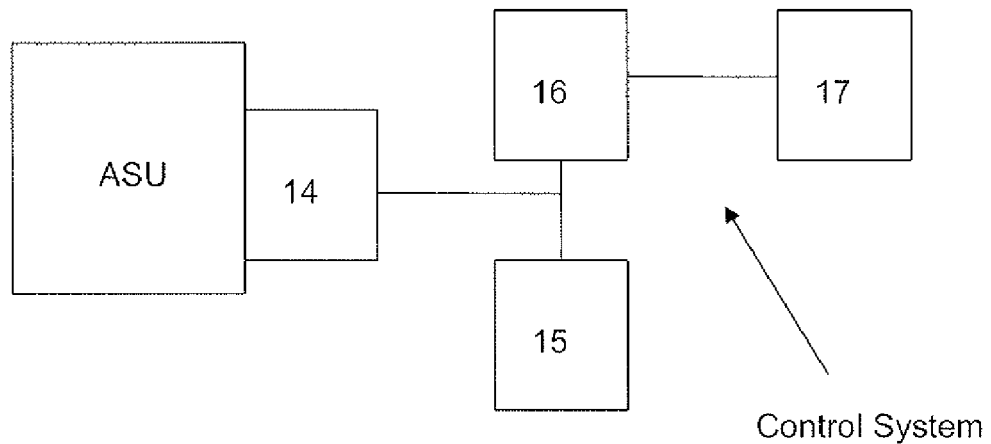
FIG. 2 is a diagrammatic view of the control system according to the invention.
Figure 3:
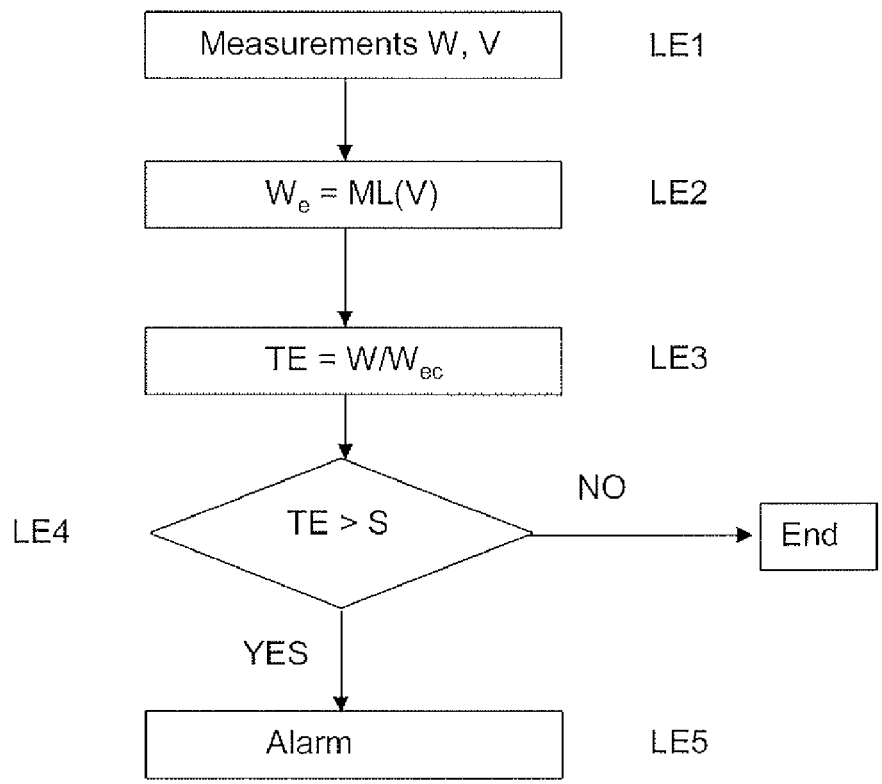
FIG. 3 is a diagrammatic flow chart of a process according to the invention according to a first mode of implementation.

The industrial unit ASU is associated with a system SC for controlling the energy performance according to the invention, as is represented in FIG. 2.

The system SC comprises means of measurement 14 positioned in the industrial unit ASU performing measurements at a frequency of the order of a second. The measurements are however used in the form of time averages. Means of storage 15 make it possible to record the corresponding data.

The measurements include in particular measurements of the electrical power consumed W, as well as production parameters and environmental parameters.

The system SC also comprises means of calculation 16 using a behavioural or statistical model to calculate an estimate $W_e$ of the electrical power consumed.

According to a first embodiment, the behavioural model used is of linear type ML, obtained by linear regression on real data, during a prior phase of learning over a reference period.

The set V of input variables of the model ML comprises production constraints, and in particular:
- the flow rate $QN_g^{hp}$ of production of high-pressure gaseous nitrogen
- the flow rate $QO_g^{hp}$ of production of high-pressure gaseous oxygen,
- the flow rate $QO_g^{mp}$ of production of medium-pressure gaseous oxygen
- the flow rate QAir of production of compressed air
- the flow rate $QN_l$ entering the means of storage of the production of liquid nitrogen
- the flow rate $QO_l$ entering the means of storage of the production of liquid oxygen and moreover environment parameters, in particular:
- the atmospheric pressure $P_a$
- the ambient temperature $T_a$.

The system furthermore comprises means of informing an operator, in the form for example of a computer terminal 17.

The components of the control system are linked by networked communication means.

The following steps are thus carried out, at regular intervals, after the initial learning phase.

In a first step LE1, the value of the set V of input variables hereinabove, as well as the consumption W, are provided by the means of measurement 14.

In a second step LE2, by taking account of the value of the set V of input variables, which is provided by the means of measurement 14, the model ML calculates an estimate $W_e$ of the electrical power consumed by the industrial unit.

In a third step LE3, it is then possible to calculate an indicator called the energy coefficient TE, corresponding to the quotient $W/W_e$.

In a fourth step LE4, the indicator TE is compared with at least one determined threshold S. If the indicator TE exceeds this threshold, an over-consumption is detected. Likewise, an under-consumption may be detected, by comparison with an under-consumption threshold.

In a fifth step LE5, an alarm may be emitted in case of energy over-consumption.

The model ML thus makes it possible, for example monthly, to obtain an evaluation of the energy efficiency, that is to say a diagnosis of under-consumption or of over-consumption with respect to past observations, of which the model takes account through its learning.

The model ML takes no account of the various settings and configurations of the equipment of the plant, and it is linear.

Consequently, it is of medium accuracy, but it is simple to put in place.

The value of the energy coefficient indicator TE is in general close to one.

According to a second embodiment, the control system SC comprises the same elements as those indicated in the first embodiment and in FIG. 2.

However, in this second embodiment, the model used by the means of calculation 16 is a nonlinear model MNL, comprising according to variants at least one neural network or tools for local regression, the model being calibrated on real data, during a prior phase of learning over a reference period.

The set V of input variables of the model MNL comprises production constraints, and in particular:
- the flow rate $QN_g^{hp}$ and the pressure $PN_g^{hp}$ of production of high-pressure gaseous nitrogen,
- the flow rate $QO_g^{hp}$ and the pressure $PO_g^{hp}$ of production of high-pressure gaseous oxygen,
- the flow rate $QO_g^{mp}$, the pressure $PO_g^{mp}$ and the percentage purity $PPO_g^{mp}$ of production of medium-pressure gaseous oxygen,
- the flow rate QAir and the pressure PAir of production of compressed air,
- the flow rate $QN_l$ entering the means of storage of the production of liquid nitrogen,
- the flow rate $QO_l$ entering the means of storage of the production of liquid oxygen, environmental parameters, in particular:
- the atmospheric pressure $P_a$
- the ambient temperature $T_a$ and parameters characteristic of the production context, in particular:
- the nitrogen vaporization flow rate $QN_v$
- the oxygen vaporization flow rate $QO_v$
- the oxygen venting flow rate $QO_{Air}$.

By taking account of the above input variables, the model calculates an estimate of the electrical power consumed by the industrial unit.

Furthermore, additional measurements relating to the configuration of the equipment are carried out, in particular:
- the variables of usage $UC_v$ of the variable flow rate compressors,
- the variables of usage $UC_p$ of the fixed flow rate compressors,
- the variables of usage UP of the pumps,
- the variables of usage UO of the columns.

Each usage variable for an item of equipment considered may take two values corresponding to the item of equipment considered being on or off.

Measurements are also carried out relating to the setting of the equipment, in particular:
- the flow rates $QC_v$ of the variable flow rate compressors
- the flow rates QP of the pumps
- the flow rates QO of the columns.

The set CR of the abovementioned configuration and setting data for the equipment are stored in the means of storage 15.

During the learning phase, the following steps are carried out at determined time intervals.

In a first step, all the data relating to the state of the industrial unit are provided by the means of measurement 14: the value of the set V of input variables, as well as the set CR of configuration and setting data for the equipment and the consumption W, during a reference period, and stored in the means of storage.

In a second step, among the data stored, the set of operating points, that is to say of given combinations of values of the set V of input variables, are traversed to search for the best consumption W for each of them and to form an association ASSO between the values of the set V and this best consumption W, the set of associations constituting the calibration parameters of the model MNL.

To each association ASSO is added the set CR of configuration and setting data for the equipment, that made it possible to obtain this optimal consumption.

The thus-constructed set of associations ASSO, representing the calibration parameters of the model, is stored in a specific file FS in the means of storage.

The configuration of the equipment and their settings corresponding to a best energy consumption, which we shall denote CR+, may thus be retrieved during a phase of real-time control.

Figure 4:
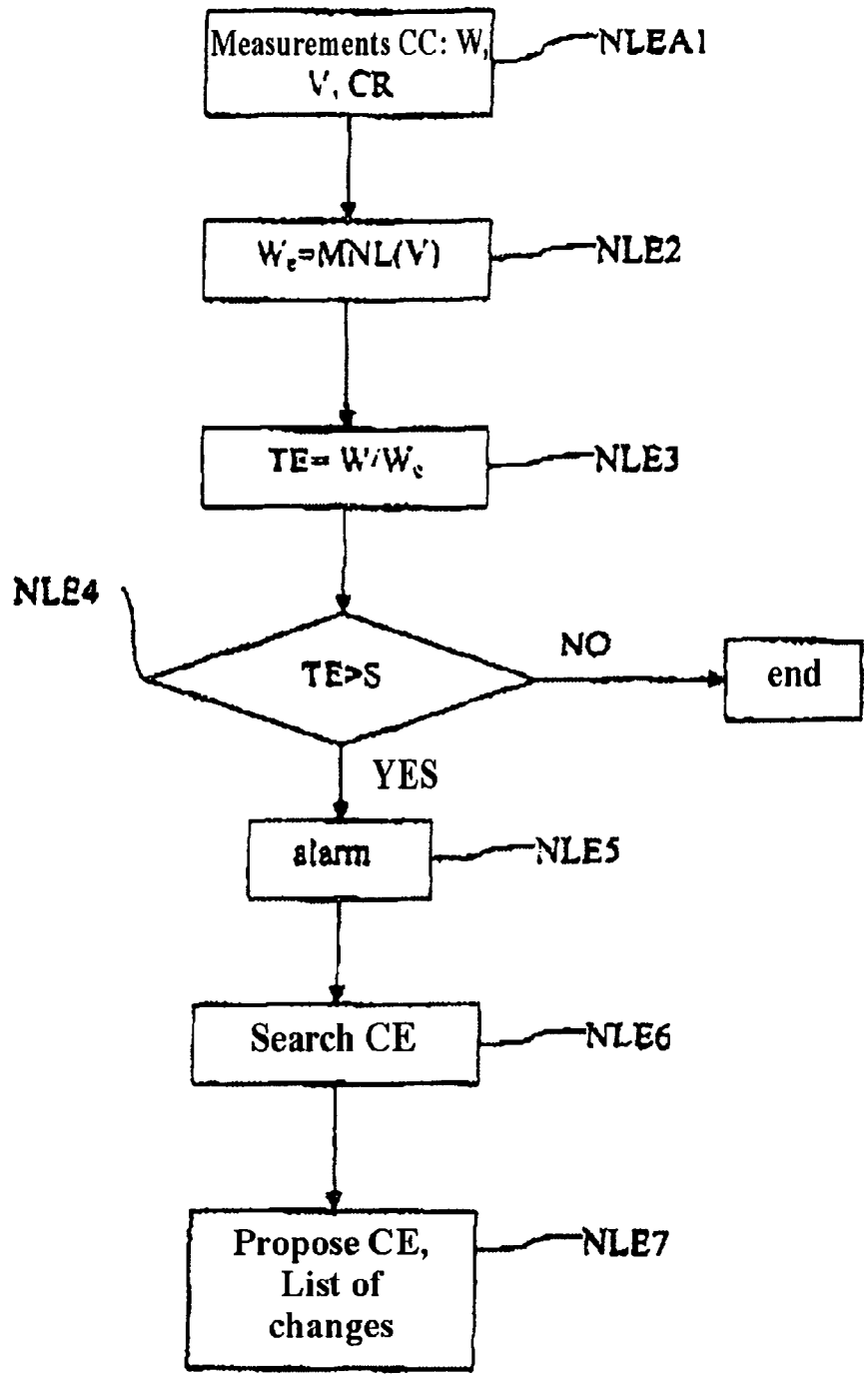
FIG. 4 is a diagrammatic flow chart of certain steps of a phase of control of a process according to the invention according to a second mode of implementation.

During the usage of the control system in an energy performance control phase, the following steps are carried out, as is represented in FIG. 4.

In a first step NLE1, all the data relating to the state of the industrial unit are provided by the means of measurement 14: the value of the set V of input variables above, as well as the set CR of configuration and setting data for the equipment and the consumption W.

In a second step NLE2, by taking account of the value of the set V of input variables above, provided by the means of measurement 14, the model MNL calculates an estimate $W_{e^+}$ of the electrical power consumed by the industrial unit, corresponding to a best consumption observed.

In a third step NLE3, it is then possible to calculate the value of the energy coefficient indicator TE+, corresponding to the quotient $W/W_{e^+}$.

In a fourth step NLE4, the value of the indicator $TE_+$ is compared with at least one determined threshold S. If the indicator $TE_+$ exceeds this threshold, an over-consumption is detected. Likewise, an under-consumption may be detected, by comparison with an under-consumption threshold.

In a fifth step NLE5, an alarm may be emitted in case of energy over-consumption.

In a sixth step NLE6, the model MNL provides, in conjunction with the estimate $W_{e^+}$ of the best consumption obtained and the set of values of input variables V, the associated set CR+ of configuration and setting data for the equipment.

In a seventh step NLE7, this set $CR_+$ of configuration and setting data for the equipment making it possible to improve consumption is proposed to the user, with:

the list of equipment advocated from among the compressors 2, the pumps 3 and the columns 4, this amounting to indicating the recommended on/off values of the usage variables $UC_V$, $UC_F$, UP, UO, and the estimate of the settings of the associated flow rates $QC_V$, QP, QO for the equipment, if necessary, for the variable flow rate compressors 2, the pumps 3 and the columns 4.

A summary of the changes induced to achieve a given configuration and given setting $CR_+$, with respect to the current configuration and settings CR, may also be provided, indicating the equipment to be turned off or to be started up, as well as the possible settings of flow rate to be carried out, doing so by identifying the differences between the current configuration and current settings CR and the proposed configuration $CR_+$.

The process is implemented in real time, the measurements being performed by the means of measurement 14 continuously.

The implementation of this process and of the control system SC, in this embodiment, makes it possible, in real time, to obtain an automatic evaluation of the energy efficiency, that is to say a diagnosis of under-consumption or of over-consumption with respect to the past observations.

The configuration and setting data sets $CR_+$ recorded during the learning phases correspond to a minimum of energy consumption, with given input variables V.

As a variant, it is possible to propose several sets $CR_+$ of configuration and setting data recorded to the operator in case of over-consumption.

Thus it is possible to propose simple changes which, however, induce a small energy gain and complex changes which induce larger gains.

The model also makes it possible to obtain an estimate of potential gain of energy consumption on making a change.

In contradistinction to the energy coefficient indicator TE of the first embodiment, the value of the energy coefficient $TE_+$ of the second mode of implementation is in general greater than one, since the model represents the best consumption observed in the past under the same conditions. This rate becomes less than one if the consumption is less than that noted in the past. A relearning may then be carried out so as to take account of the set CR of current configuration and setting data.

It is thus possible to use the system SC as a real-time decision aid tool for assisting the operators with setting and configuring, to obtain a setting which is at least as good as in the past.

In this mode of implementation, as in the previous one, it is necessary to carry out a phase of learning over an initial reference period, and it is possible to carry out a new learning after a determined duration of usage of the system.

According to a variant, a new learning is carried out after a determined duration of usage of the system SC. In particular, it is possible to carry out an automatic learning at regular time intervals. For example, a relearning every month on a learning base which includes the data recorded in the means of storage 15 in the course of the twelve months preceding the relearning, or else a relearning each month on a learning base of increasing size which includes all the data since the last major technological modification of the plant up to the date of relearning.

According to a variant, the industrial unit for which the energy performance is not the air separation unit as a whole, but only a group of compressors for oxygen or nitrogen, or air product.

In this case, the set V of input variables comprises:
the flow rate and the pressure of the gas produced by the group of equipment of compressor 2 type,
the pressure and the temperature upstream of the compressors 2.

The set CR of configuration and setting data comprises the configuration of the equipment and their setting in terms of flow rate, and the electrical power consumed W is that of the compressor group 2.

According to another variant, the industrial unit for which the energy performance is not the air separation unit as a whole, but only but a liquefier 8.

In this case, the set V of input variables comprises:
the liquid flow rate of product $N_L$ leaving the liquefier 8,
the pressure and the temperature of the gas entering the liquefier 8.

The set CR of configuration and setting data comprises specific data of the liquefier, namely the pressure of the cycle, the temperature of the liquid and the recycling flow rate, and the electrical power consumed W is that of the liquefier 8.

As goes without saying, the invention is not limited to the preferential embodiments described hereinabove, by way of nonlimiting examples; on the contrary it embraces all the variants thereof within the scope of the claims hereinbelow.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for controlling the energy performance of an industrial unit or of a part of the industrial unit, wherein said industrial unit comprises an air separation unit, wherein said part of the industrial unit comprises a compressor and a liquefier, wherein the industrial unit is subject to changes in atmospheric and environmental conditions, the process comprising:
   a) measuring a value of a set (V) of variables relating to both a production capacity of the industrial unit and to an environment, and measuring a value of a quantity representing an energy performance (W);
   b) calculating an estimate ($W_e$) of a quantity representing the energy performance, using a statistical model (ML, MNL) calibrated on the basis of the values of the set (V) of the variables relating to a production capacity of the industrial unit (ASU) and an atmospheric and environmental conditions, during a phase of learning over a reference period;
   c) determining a value of an energy performance indicator (TE, $TE_+$) on the basis of a measured value (W) and the estimated value ($W_e$) of the quantity representing the energy performance; and
   d) comparing the value of the energy performance indicator with at least one predetermined threshold value (S) to detect said energy performance,
   e) detecting a drift in the energy performance, and adjusting said compressor and/or said liquefier to optimize the energy performance of the industrial unit or of the part of the industrial unit.

2. The process of claim 1, wherein, during the learning phase, the best operating points, corresponding to the best energy performance (W) observed associated with each given value of the set (V) of input variables, are taken into account in the model (MNL).

3. The process of claim 2, wherein in the model (MNL), each association (ASSO) between a given value of the set (V) of input variables and the best energy performance (W), corresponding to an operating point, also comprises a set (CR) of configuration and setting data for equipment associated with this operating point.

4. The process of claim 3, wherein said set (CR) of configuration and setting data for the equipment of the industrial unit comprises at least one variable of usage of an item of equipment indicating its on or off state ($UC_F$, UP, UO).

5. The process of claim 4, wherein the set (CR+) of learnt configuration and setting data for the equipment that made it possible to obtain the best energy performance ($W_{e^+}$) for the current value of said set (V) of input variables is proposed to the user, with:
   a) the list of advocated equipment, using the on/off values of the usage variables ($UC_v$, $UC_F$, UP, UO) recorded; and
   b) the estimate of the settings ($QC_v$, QP, QO) for the equipment, if necessary.

6. The process of claim 5, wherein a list of the changes induced so as to achieve a given configuration and settings of the equipment ($CR_+$) with respect to the current configuration and settings (CR) is provided, indicating the equipment to be turned off or to be started up, as well as the possible settings to be effected.

7. The process of claim 3, wherein said set (CR) of configuration and setting data for the equipment of the industrial unit comprises at least one value of setting of an item of equipment, in particular a flow rate setting ($QC_v$, QP, QO).

8. The process of claim 2, wherein, when an over-consumption is detected, the model (MNL) provides a set (CR+) of learnt configuration and setting data for equipment that made it possible to obtain the best energy performance ($W_{e^+}$) for the current value of the set (V) of input variables.

9. The process of claim 1, wherein the statistical model is of linear type (ML).

10. The process of claim 9, wherein said statistical model is obtained by linear regression on data of the learning phase.

11. The process of claim 1, wherein the statistical model is of nonlinear type (MLN), in particular comprising at least one neural network or tools for local regression.

12. The process of claim 11, wherein said statistical model comprises at least one neural network or tools for local regression.

13. The process of claim 1, wherein the quantity representative of the energy performance is the electrical power consumed (W) of the industrial unit.

14. The process of claim 1, wherein an alert to an operator is emitted in case of energy over-consumption.

15. The process of claim 1, wherein said energy performance indicator (TE, $TE_+$) is defined as the ratio of the measured value (W) to the estimated value ($W_e$) of the quantity representing the energy performance.

16. The process of claim 1, wherein the set (V) of input variables comprises:
   a) the atmospheric pressure ($P_a$) and the ambient temperature ($T_a$);
   b) production flow rates ($QN_g^{np}$, $QO_g^{hp}$, $QO_g^{mp}$, QAir, $QN_l$, $QO_l$) for the unit;
   c) production pressures ($PN_g^{hp}$, $PO_g^{hp}$, $PO_g^{mp}$, PAir);
   d) production rating data ($PPO_g^{mp}$); and
   e) flow rates of vaporization ($QN_v$, $QN_O$) of liquids and of venting of gases,
a set (CR) of configuration and setting data for the equipment comprises the configuration of the equipment and the flow rate of the equipment, and the energy performance (W) is that of the industrial unit as a whole.

17. The process of claim 1, wherein a set (V) of input variables comprises:
   a) the flow rate and the pressure of the gas produced from a group of equipment of compressor type; and
   b) the pressure and the temperature upstream of compressors,
a set (CR) of configuration and setting data for the equipment comprises the configuration of the equipment and their setting in terms of flow rate, and the energy performance (W) is that of the group of compressors.

18. The process of claim 1, wherein said set (V) of input variables comprises:
   a) the liquid flow rate of product ($N_L$) leaving a liquefier; and
   b) the pressure and the temperature of the gas entering the liquefier,
a set (CR) of configuration and setting data for the equipment comprises pressure, the temperature of the liquid and the recycling flow rate, and the energy performance (W) is that of the liquefier.

19. The process of claim 1, wherein the process is implemented in real time, the measurements being performed continuously.

20. The process of claim 1, wherein a recalibration is performed, so as to integrate new learning data, at a pre-established frequency, or on the request of an operator.

* * * * *